United States Patent [19]

Spong et al.

[11] Patent Number: 4,625,217

[45] Date of Patent: Nov. 25, 1986

[54] BROAD BAND MULTILAYER OPTICAL STORAGE STRUCTURE HAVING A THIN METALLIC OPTICALLY TRANSMISSIVE LAYER

[75] Inventors: Fred W. Spong; Boris J. Muchnik, both of Boulder, Colo.

[73] Assignee: Storage Technology Corporation, Louisville, Colo.

[21] Appl. No.: 628,357

[22] Filed: Jul. 6, 1984

[51] Int. Cl.$^4$ .................. G01D 9/00; G01D 15/10
[52] U.S. Cl. .................. 346/76 L; 346/135.1
[58] Field of Search .................. 346/76 L, 135.1

[56] References Cited

U.S. PATENT DOCUMENTS

| | | | |
|---|---|---|---|
| 3,689,768 | 9/1972 | Sato | 346/135.1 |
| 4,188,214 | 2/1980 | Kido | 346/135.1 |
| 4,425,570 | 1/1984 | Bell | 346/76 L |
| 4,465,767 | 8/1984 | Oba | 346/76 L |

*Primary Examiner*—E. A. Goldberg
*Assistant Examiner*—Mark Reinhart
*Attorney, Agent, or Firm*—Rosen, Dainow & Jacobs

[57] ABSTRACT

An optical recording structure layer has an optical reflecting layer, a phase layer on the reflective layer, an active layer on the phase layer and a matrix layer on the active layer. The phase layer and matrix layer are substantially transparent to radiation. A thin metal layer on the matrix layer has a thickness from 20 to 100 Angstroms to achieve a relatively constant absorption and reflection characteristics for the structure over a broad band of radiation.

2 Claims, 4 Drawing Figures

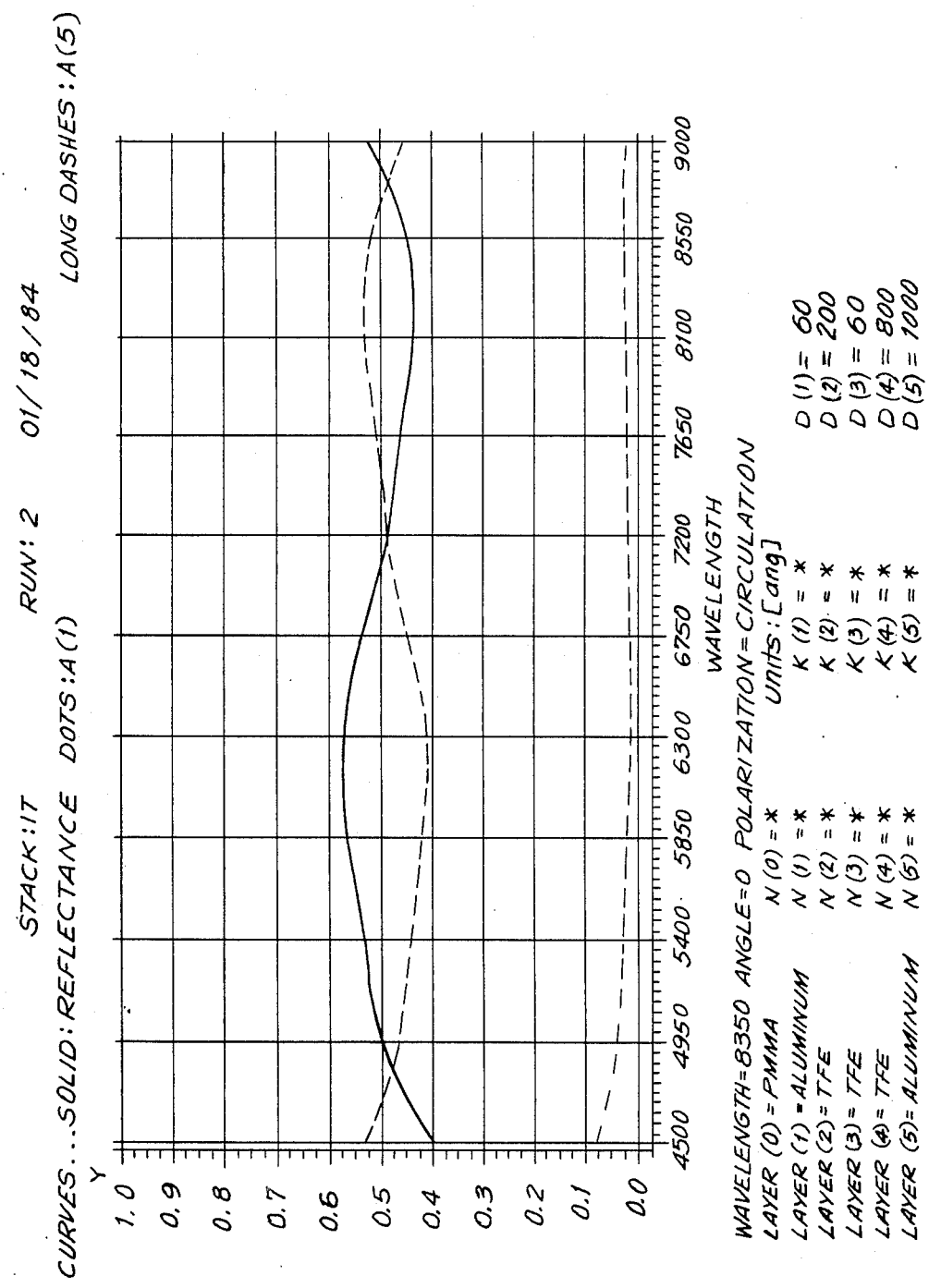

BROAD BAND MULTILAYER OPTICAL STORAGE STRUCTURE HAVING A THIN METALLIC OPTICALLY TRANSMISSIVE LAYER

This invention relates to optical storage devices of the type comprising a rotatable disk having an active structure enabling variation of optical properties by means of focused write radiation, such as a laser beam, and reading data stored thereon by means of focused read radiation beam.

This invention is more particularly directed to the provision of means in an optical storage structure for rendering the absorption and reflection characteristics of the structure relatively constant over a relatively broad radiation band.

An optical structure of the above type is disclosed, for example, in U.S. application Ser. No. 499,666, Muchnik, filed May 31, 1983, and assigned to the present assignee.

In accordance with the disclosure of copending application U.S. application Ser. No. 628,194 filed July 6, 1984 a preferably disk shaped substrate, for example, of aluminium or plastic, is provided with a planarizing layer, for example a thin coat acrylic material, to provide an optically smooth surface. A reflective layer for the structure is deposited on the planarizing layer, and thereupon the three layer structure disclosed in application Ser. No. 499,666 is deposited. The phase layer, for example of a fluorocarbon, is tuned, i.e., it has a thickness such that destructive interference occurs Between radiation reflected from the active layer and adiation transmitted by the active layer and reflected from the reflective layer and transmitted by the active layer. This destructive interference phenomenon occurs for both read and write beams. It enhances the write sensitivity by increasing the coupling of the write beam energy to the active layer. It also enhances the read signal by increasing the reflectivity contrast between written marks and unwritten surrounding regions.

In order to eliminate the effect of any dust or small particles falling on the structure, a dust defocusing layer is provided on the structure, being adhered thereto by an adhesion layer deposited on the matrix layer. The phase and matrix layers, and adhesion and dust defocusing layers are transparent to radiation of the read and write frequencies.

The present invention is directed to the provision of means in the above optical storage structure for rendering the absorption and reflection characteristics relatively constant over a broad wavelength band, for example, from 4500 Angstroms to 9000 Angstroms.

In accordance with the invention, it has been found that providing the adhesive layer with a thickness of from 20 Angstroms to 100 Angstroms stabilizes the reflectance and absorption characteristics of the optical structure over a wide radiation band, for example, from 4500 Angstroms to 9000 Angstroms.

In order that the invention may be more clearly understood it will now be disclosed in greater detail with reference to the accompanying drawings, wherein:

FIGS. 3 and 4 shows curves illustrating the reflectance and absorption of various optical recording structures in accordance with the invention.

Figure 1:
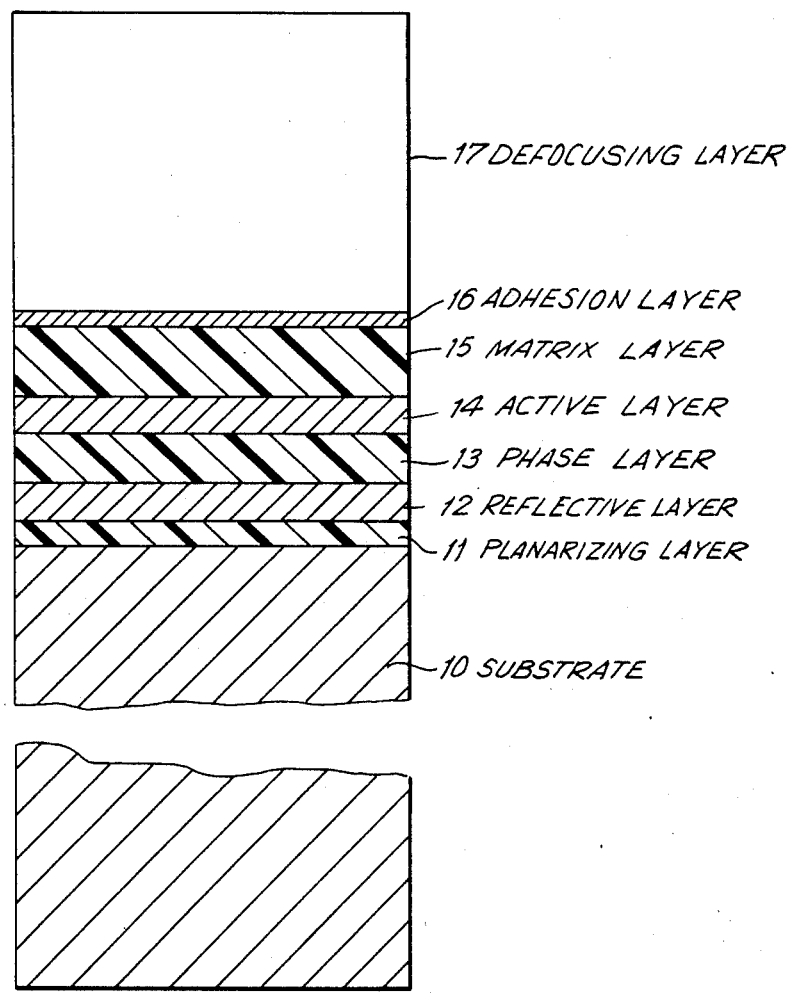
FIG. 1 is a cross-sectional view of an optical recording structure in accordance with the invention.

One form of optical storage device, in accordance with the invention, as illustrated in the cross-sectional view of FIG. 1, is comprised of a substrate 10 of, for example, aluminum or a plastic material. The substrate 10 may have a thickness of about 0.075 inches and be in the form of a disk of 14 inches diameter. These parameters are of course not limiting to the present invention.

The surface of the substrate disk 10 conventionally has small imperfections, micro irregularities, tooling marks, polishing streaks, etc., which are undesirable for the optical properties of the recording media, and in order to remove these imperfections, a planarizing layer 11 is preferably provided on at least one surface of the substrate. The planarizing layer may have a thickness of for example 2 to 25 micrometers and may comprise an acrylic layer solvent coated by spin coating. The surface of this layer should have a micro roughness less than 5 nanometers.

The planarizing layer may also serve to prevent corrosion of the substrate, as well as to provide a chemical barrier between residual substrate contamination and the four layer structure of the reflective layer, phase layer, active layer and matrix layer described in the following paragraphs.

As one example, the planarizing layer has been comprised of Rohm and Haas Acryloid A-10. This material is a solvent base Methyl-Methacrylate thermoplastic resin in Cellosolve acetate having a viscosity of 800 to 1200 cps (Brookfield 25 degrees C.), 30% plus or minus 1% percent solid, a density of 8.6 lbs. per gallon and a glass transition temperature of the polymer of 105 degrees C. The Acryloid A-10 resin was dissolved in a solution of Cellosolve acetate and butyl acetate with a final solvent ratio of 9:1, Cellosolve acetate to butyl acetate. The Cellosolve acetate was Urethane grade (boiling point of 156.2 degrees C.), and the butyl acetate was spectral grade (boiling point of 126.5 degrees C.). The butyl acetate may be substituted by Cellosolve acetate. The solution has a solid content of 22%, and a viscosity of 133 cps (Brookfield at 21 degrees C.), filtered to 0.2 micrometers.

The planarizing layer provides a base for the reflecting layer 12. The reflecting layer is preferably of aluminum, although copper or silver may be alternatively employed. A thickness of about 100 nanometers is preferred, although this dimension is not critical. It must be highly reflective at the read, write and coarse seek wavelengths employed, for example 633, 830 and 780 nanometers respectively. The reflectivity should be equal to or greater than 0.85 in air, at these wavelengths.

The reflective layer 12 is preferably formed by sputtering on the planarizing layer, for example employing Leybold-Heraeus in-line vacuum deposition system.

It will of course be apparent that the invention herein is not limited to the above structure wherein the reflective layer is formed on a planarizing layer, and suitable techniques for forming a reflective surface of the required planarity, supported by the substrate, may be employed.

The next three layers, defining a three layer structure are comprised of a phase layer 13 on the reflective layer, an active layer 14 on the phase layer and a matrix layer 15 on the active layer. The phase layer and matrix layer may be of a plasma polymerized fluorocarbon with a fluorine to carbon atomic ratio of (for example only) 1.8. The active layer may be a tellurium alloy, preferably $Te_{65}Se_{20}As_5Ni_{10}$, identified herein as alloy STC 68.

In response to a write beam (for example a laser beam) the optical energy of the beam is dissipated as thermal energy in the active layer, whereby the active layer agglomerates within the surrounding fluorocarbon phase and matrix layers. This agglomeration affects the optical transmittance of the three layer structure in accordance with the signal modulation of the write beam. At the read wavelength and coarse seek wavelengths the active layer absorbs energy to a different extent in the written and unwritten areas, to develop a reflective contrast.

The phase layer optically adjusts the absorption and reflectivity of the three layer structure at the read, write and coarse seek wavelengths, the phase layer thereby having a tuned thickness to effect destructive interference in reflection between partial beams reflected from the active layer and reflective layers, at the active layer for beams of the read and coarse seek wavelengths, as a result of reflection of these beams at the reflective layer 12. The phase layer 13 also isolates the active layer from the heat sinking effect of the highly conductive reflecting layer, thereby enabling the energy of the write beam to be effectively dissipated in the active layer. In addition, as discussed above the phase layer provides a matrix into which the active layer can be dispersed. The phase layer may have a thickness, for example, of 80 nanometers with an index of refraction of 1.38.

Figure 2:
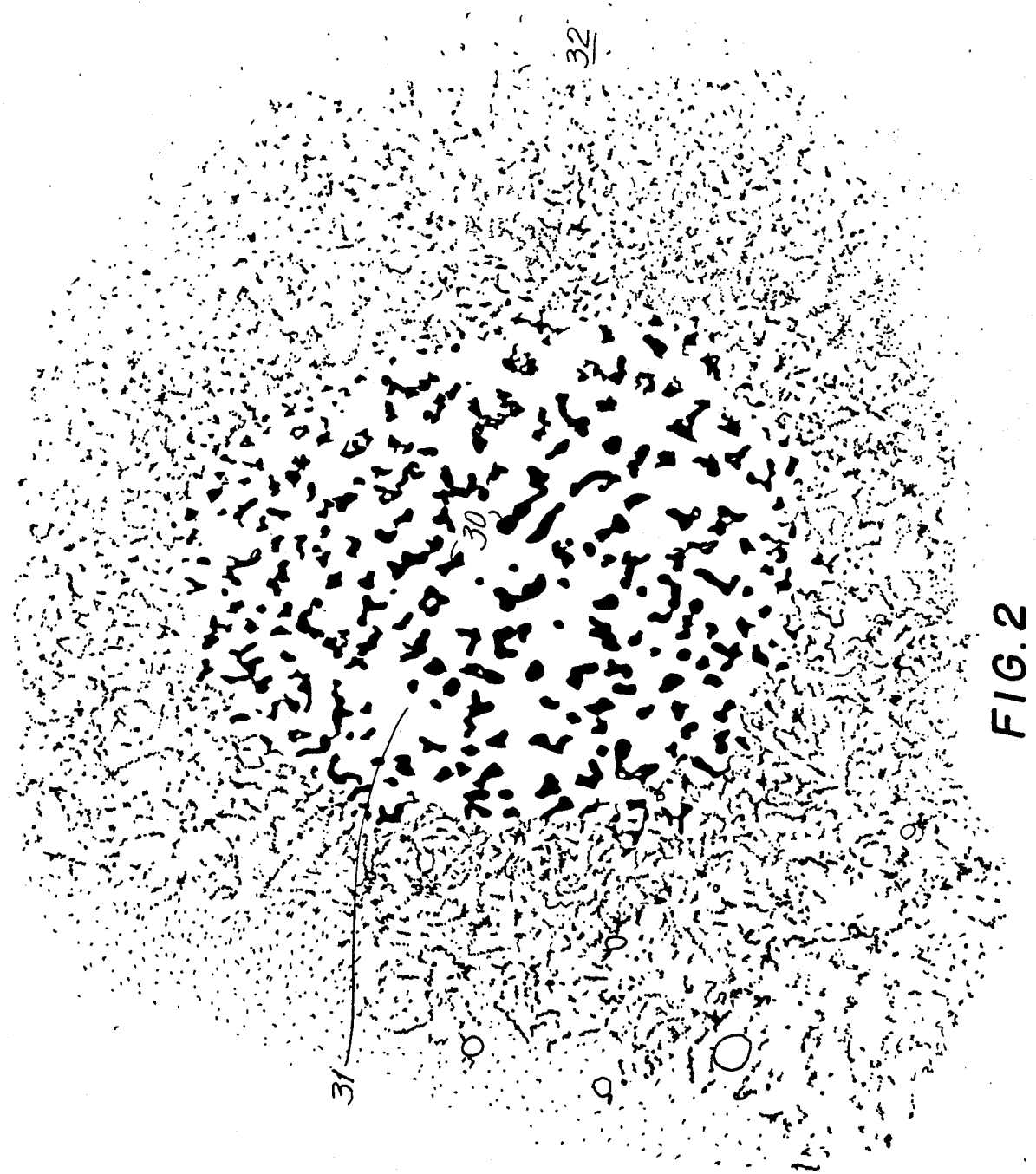
FIG. 2 is an electron-beam photograph of a portion of the active layer of the recording structure.

The active layer is a thin layer having discrete island-like globules. The layer therefore has irregular or discontinuous upper and lower surface characteristics defined by the globular surfaces. The mass equivalent average thickness of the active layer is thus about 5 to 8 nanometers. The globules denote discrete particles of dimension averaging within the range of 1 to 8 nanometers. It must be stable chemically, optically and in atomic structure. It has an amorphous lattice structure, with a glass transition temperature greater than 80 degrees C. The agglomeration of the globules in response to the heat generated by the write beam is illustrated in the electron-beam photograph of FIG. 2, wherein it is seen that the material of the active layer has agglomerated to form enlarged globules 30 interspersed by large transparent areas, in the generally circular region 31 that has been exposed to the write beam, the surrounding region 32 of the active layer remaining substantially reflective.

The matrix layer 15 may have a thickness of, for example, 270 nanometers.

The fluorocarbon phase layer and fluorocarbon matrix layer are preferably formed by plasma polymerization, and the active layer deposited by sputtering, for example employing a Leybold-Heaeus in-line vacuum deposition system.

An adhesion layer 16 is provided on the matrix layer. The adhesion layer, in addition to providing the proper surface energy for the application of the outer defocusing layer, also provides adhesive coupling between the matrix layer and the defocusing layer. While the defocusing layer 17 may be applied directly to the matrix layer 15, it has been found that adequate bonding by such direct application is not achieved, for example, when the defocusing layer is of a material such as acrylic UV-curable photo polymer. The defocusing layer must be adhered firmly to the storage structure, such that it will not loosen by the variable stresses acting thereon, such as thermally induced stresses due to differential expansion or the centrifugal force cause by rotation of the disk, and similarly induced forces that may effect a gradual deterioration of adhering forces. The adhesion layer 16 thus serves to inhibit the eventual separation of the defocusing layer 17 from the matrix layer 15, in use. This adhesion layer is preferably comprised of a layer of aluminum from 1 to 10 nanometers thick, preferably about 2 nanometers thick. The adhesion layer 16 may be formed by sputtering aluminum, for example employing a Leybold-Heraeus in line vacuum deposition system.

The outer layer 17 of the structure is a defocusing layer, which serves to optically defocus dirt and dust particles and the like which have come to rest thereon. The defocussing effect prevents interference with the optical structures formed in the active layer, in writing and reading data, and in the optical seeking operations. The critical properties of the defocusing layer are that it be sufficiently thick to defocus dust particles that lay on the surface of the disk. In this sense, it is desirable that the layer be set to have, for example, a working thickness of about one millimeter. This selection must be balanced however in view of factors that suggest the desirability of a thinner defocusing layer, such as the difficulty of depositing an extremely thick layer with uniformity of thickness and optical integrity, and the rendering of the disk more vulnerable to film stress induced warping from thicker films. In one embodiment of the invention, the defocusing layer was an acrylic polymer with a thickness of about 178 micrometers, composed of an acrylic ultraviolet curable photopolymer acrylic having a viscosity of 18 plus or minus 3 cps (Brookfield, UL, 12 rpm, 25 degrees C.). Its surface tension was 27 plus or minus 3 dynecm−1. The refractive index as a liquid was 1.455 plus or minus 0.005, and as a solid 1.494 plus or minus 0.005. The glass transition temperature was 56 degrees C. and the density was 1.06 plus or minus 0.001 g-cc (25 degrees C.). The shrinkage upon curing was 12%, and the water pickup was 0.5%. The material was prefiltered to 0.2 microns before use.

The dust defocusing layer may be applied by rotating the disk in a horizontal plane, at a speed of, for example, 20 rpm. The acrylic polymer is preferably applied to the surface of the adhesion layer by means of a nozzle controlled to move from a predetermined inner diameter position of the disk to a predetermined outer diameter position, for example, between an inner diameter position of about 7.6 inches and the outer diameter position of 13.945 inches on a disk of about 14 inches diameter. The rotation of the disk during the application of the acrylic polymer achieves a thickness uniformity of plus or minus 0.005 inches in the active area of the disk, for example, between diameters 8.66 inches and 13.84 inches. The micro roughness of this surface is no greater than 10 nanometers units rms, and surface undulations having spatial wavelengths from 0.5 millimeters to 5.0 millimeters is less than 20 nanometers peak to peak.units PP. No defect is permissible greater than 200 micrometers in size. Following deposition of acrylic polymer, the layer is cured in ultraviolet light for a time less than 60 seconds, the curing being effective before removal of the coated disk from the deposition apparatus. The uniformity of exposure of the layer to ultraviolet curing light must be better than 90 percent, since uniformity is needed not just for an even cure, but also so that any change induced in the media is uniform. In the above example, the intensity of the curing light at the disk surface must be 25 milliwatts per square centimeter or greater, preferably with the spectral intensity concentrated around 360 nanometers. The intensity of infrared radiation during curing must be low, for example, less than 22 milliwatts per square centimeter, since the dust defocusing layer may be damaged by infrared radiation prior to curing.

An optical storage structure as above described in the form of a disk of about 14 inches diameter, is adapted to be rotated at a rate of for example, about 1300 rpm. Writing of data on the disk is effected by a focussed laser beam, at the write frequency, with a spot diameter of 0.85 plus or minus 0.05 micrometers, FWHM, the beam having a write power equal to or less then 16 milliwatts. The reading photodetectors are adapted to read spot sizes of about 0.75 micrometers.

In copending application Ser. No. 499,666, Muchnik et al, filed May 31, 1983, assigned to the assignee of the present application, illustrations are provided for showing, at the submicroscopic level, the interface between the matrix layer, active layer and phase layer, showing that the discrete globules of the active layer are encapsulated between the fluorocarbon material of the matrix layer and phase layer. Said prior application points outs that the mode by which the optical properties of the three layer structure are varied in response to heat from a laser beam is not known. It is believed at the present, however, that the change of optical properties is effected mainly by agglomeration of the materials rather than chemical reaction.

In accordance with the invention, the adhesive layer 16, of a metal such as titanium or aluminium, is selected to have a thickness from about 20 Angstroms to about 100 Angstroms. With this range of thickness it has been found that the adhesion layer serves not only the function of adhering the defocusing layer to the matrix layer, but also compensates for frequency variable effects in the reflection and absorption of the optical structure, thereby stabilizing the absorption and reflection characteristics over a fairly broad band, for example, from 4500 Angstroms to 9000 Angstroms. Other metals may be employed for this purpose.

Figure 3:
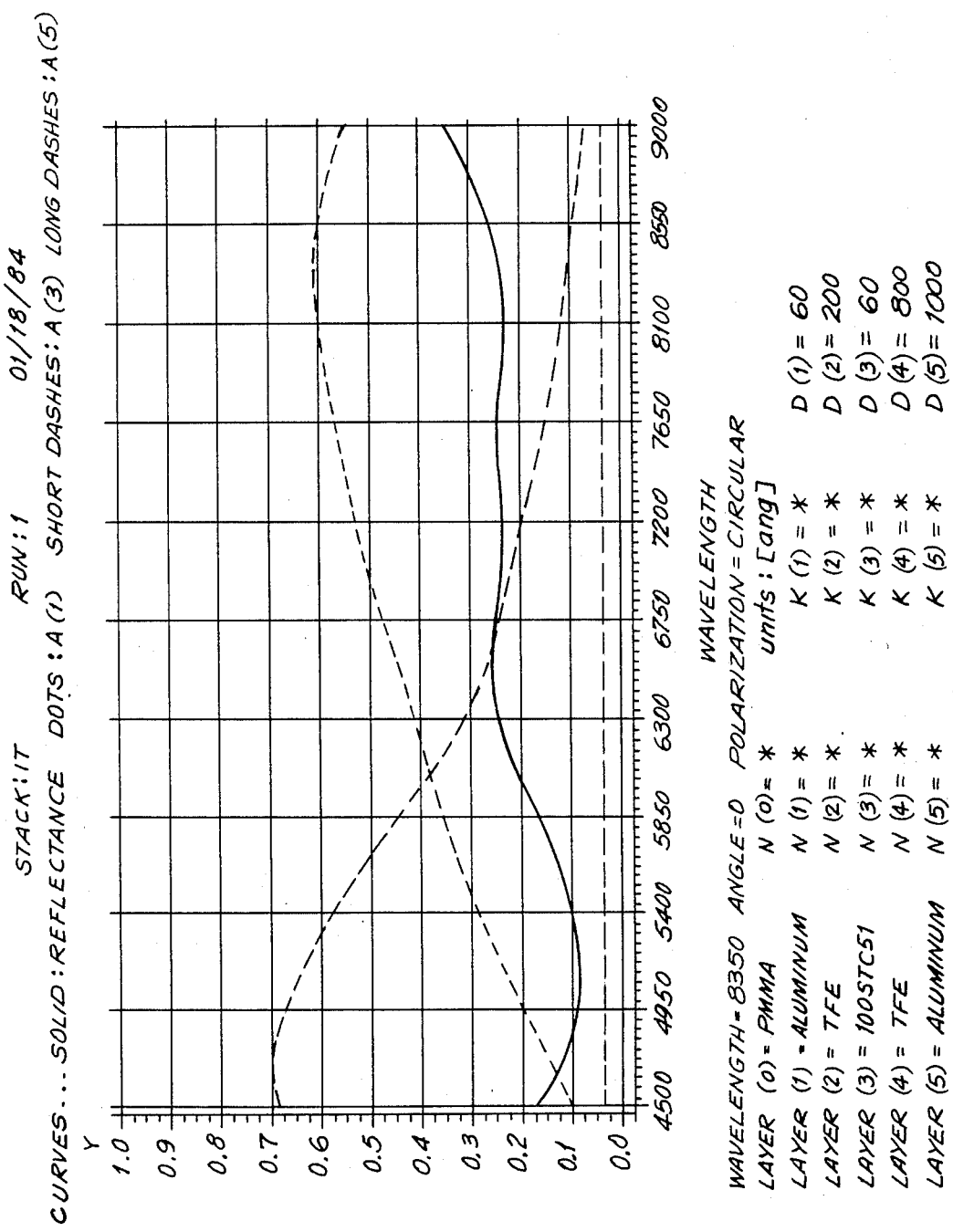

This effect is shown, for example, in FIGS. 3 and 4, which are curves illustrating the reflectance of the optical structure in a band of 4500 to 9000 Angstroms, as well as the absorption of the various layers therein. In these figures the wavelengths are given in Angstrom units, layer (0) is the dust defocusing layer, layer (1) is the adhesion layer of aluminum, layer (2) is the upper matrix layer, for example, a TFE phase layer (3) is the active layer, layer (4) is the lower matrix layer, for example a TFE layer and layer (5) is the aluminium reflection layer. The thicknesses D of these layers are indicated, in the figures in Angstrom units.

While the invention has been disclosed and described with reference to a single embodiment, it will be apparent that variations and modifications may be made therein, and it is therefore intended in the following claims to cover each such variation and modification as falls within the true spirit and scope of the invention.

What is claimed is:

1. An optical recording structure layer having an optical reflecting layer, a phase layer on said reflective layer, an active layer on said phase layer and a matrix layer on said active layer, said phase layer and matrix layer being substantially transparent to radiation; the improvement comprising a metal layer on said matrix layer, said metal layer having a thickness from 20 to 100 Angstroms.

2. The optical recording structure of claim 1 wherein said active layer comprises an alloy of selenium, tellurium and arsenic and nickel.

* * * * *

UNITED STATES PATENT AND TRADEMARK OFFICE
CERTIFICATE OF CORRECTION

PATENT NO. : 4,625,217

DATED : November 25, 1986

INVENTOR(S) : Fred W. Spong, et al.

It is certified that error appears in the above-identified patent and that said Letters Patent is hereby corrected as shown below:

Column 1, line 31, change "Between" to --between--.

Column 1, line 32, change "adiation" to --radiation--.

Signed and Sealed this

Seventh Day of May, 1991

Attest:

HARRY F. MANBECK, JR.

Attesting Officer

Commissioner of Patents and Trademarks